United States Patent [19]

Cosentino et al.

[11] Patent Number: 4,600,808
[45] Date of Patent: Jul. 15, 1986

[54] PRINT APPARATUS FOR VIDEOTEX TERMINAL

[75] Inventors: Giuseppe Cosentino, Lessolo; Franco Provera, Turin, both of Italy

[73] Assignee: Ing. C. Olivetti & C., S.p.A., Ivrea, Italy

[21] Appl. No.: 608,200

[22] Filed: May 8, 1984

[30] Foreign Application Priority Data

May 13, 1983 [IT] Italy .................. 67538 A/83

[51] Int. Cl.⁴ ........................... H04M 11/00
[52] U.S. Cl. .................................... 179/2 DP
[58] Field of Search .......... 179/2 DP, 2 TV; 358/85, 358/903, 147; 364/200 MS File, 900 MS File

[56] References Cited

U.S. PATENT DOCUMENTS

| | | | |
|---|---|---|---|
| 4,000,486 | 12/1976 | Schomburg | 364/200 |
| 4,156,904 | 5/1979 | Minowa et al. | 364/200 |
| 4,328,557 | 5/1982 | Gastinel | 364/900 |
| 4,393,404 | 7/1983 | Cox et al. | 358/147 |
| 4,412,304 | 10/1983 | Yamakita | 364/900 |
| 4,424,572 | 1/1984 | Lorig et al. | 364/900 |

OTHER PUBLICATIONS

R. E. F. Bugg, "Microprocessor Peripheral for Viewdata", *Electronic Technology*, vol. 15, Jul./Aug. 1981, pp. 125-128.
T. Tomita, "Introducing the Captain System", Proceedings of the Pacific Telecommunications Conference, Honolulu, Hi., USA, 8-9 Jan. 1979, pp. 4A15-4A23.
Watanabe et al, "Captain System-Videotex-", *National Technical Report* (Japan), vol. 27, No. 4, Aug. 1981, pp. 506-528.

*Primary Examiner*—Keith E. George
*Attorney, Agent, or Firm*—Banner, Birch, McKie & Beckett

[57] ABSTRACT

The apparatus comprises a dot printer (24) and a control unit for the printer connected to the line in parallel with a video display, the control unit is capable of processing the data received and storing it temporarily in a page memory in transcoded form in such a way as to associate with each character the relative print attributes and to be able directly to address a character generator. The control unit is capable of taking the transcoded data from the page memory for controlling the printer. The character generator comprises a portion for the alphanumeric characters, a portion for semigraphic characters and a portion for decoding colors with a corresponding grey value. The semigraphic characters are produced on a matrix of 10×12 dots in such a way that, for each grey value, the horizontal and vertical distance of the character dots of the same color remains constant.

13 Claims, 16 Drawing Figures

PRINT APPARATUS FOR VIDEOTEX TERMINAL

BACKGROUND OF THE INVENTION

The present invention relates to the terminals of videotex communication systems, that is to say systems wherein coded alphanumeric and semigraphic data which are received by way of a line are decoded and displayed on a video display. In particular, the invention relates to a print apparatus for such systems, comprising a dot printer and a control unit for the printer. Semigraphic data is also known as "block graphics".

Communication systems are known, in which a printer is connected to the line with its own interface unit, by means of which it can receive the data of a message or an image, independently of the video display. The print control means acts immediately whereby printing is effected upon reception simultaneously with the display mode. Those systems are relatively complicated and expensive because of the double interface for the video display and the printer, and relatively inflexible in operation by virtue of immediately printing of the message received.

SUMMARY OF THE INVENTION

The object of the present invention is to provide a print apparatus which does not require a separate interface and which are capable of processing the control data of a videotex communication thus making it possible to effect printing of a page after the entire page has been received.

This object is met by the print apparatus according to the present invention which is characterised in that the control unit of the printer is directly connected in parallel with the video display and is capable of temporarily storing the data received by the video display, and in that the control unit can be predisposed by a command to decode the data and cause it to be printed by the printer.

In accordance with a development of the invention, the control unit comprises means for generating for each colour code a corresponding grey value whereby coloured image received by the videodisplay is printed as a monochrome image with half tones.

BRIEF DESCRIPTION OF THE DRAWINGS

The invention will be described in more detail, by way of example, with reference to the accompanying drawings, in which.

DESCRIPTION OF THE PREFERRED EMBODIMENTS

Figure 1:
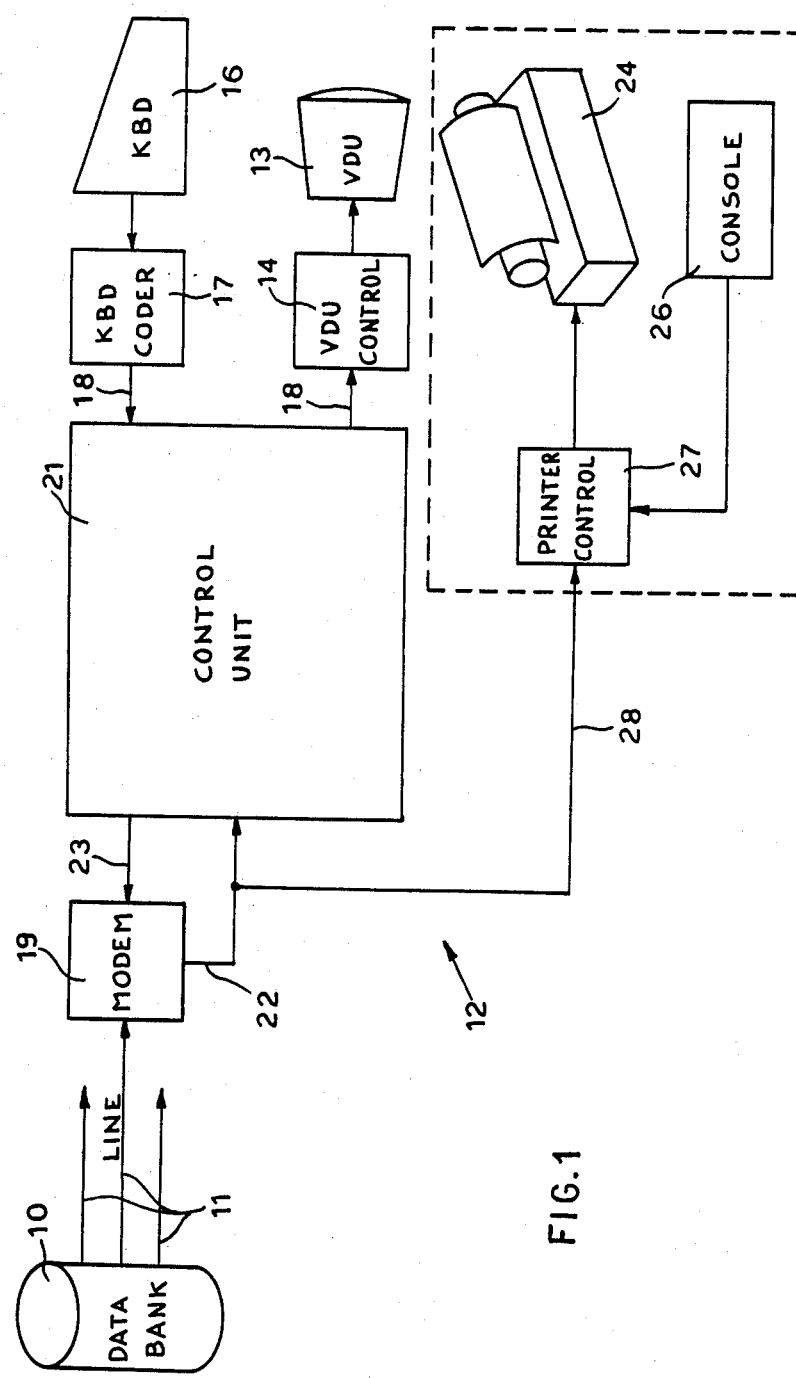
FIG. 1 is a block circuit diagram of a videotex communication system incorporating print apparatus according to the invention.

Referring to FIG. 1, a data bank 10 for a videotex communication system, can be accessed by way of telephone lines 11 by a series of terminals 12, only one terminal 12 being illustrated in FIG. 1.

The terminal 12 comprises a video display 13 for the received data, comprising a television screen which is capable of displaying images in colour and in black and white. By way of example, the screen of the video display 13 is of the nine inch (22 cm) type which is capable of displaying the image on 25 rows of 40 columns, under the control of a video control unit 14. This latter includes memory means for storing at least the data to be displayed by said video display in a page. The terminal 12 further comprises a keyboard 16 bearing a series of alphanumeric keys and a series of controls for the terminal 12, both in the mode of connection in line or locally. The keyboard 16 is connected to the usual keyboard coder 17 which is capable of supplying at a connector 18 the coding signals of the actuated keys.

The terminal 12 further comprises the usual modem 19 for modulation and demodulation of the codes which are to be sent out on the line or which are received from the line respectively. The modem 19 is of the 75/1200 baud type in accordance with the standard CCITT V 23, whereby it can operate at various transmission rates. The modem 19 is connected to a control unit 21 of the terminal by way of a receiving or output cable 22 and a transmission or input cable 23. The control unit 21 may be set up by way of the keyboard 16 for local connection of the coder 17 to the control circuit 14, by means of connection of the modulator to the demodulator of the modem 19 or by on line connection, whereby the circuit 14 receives the signals from the line, which are demodulated by the modem 19.

Finally, the terminal 12 comprises a print apparatus comprising a dot printer 24 which is provided with a control console or keypad 26 and is controlled by a control unit 27. The latter is connected by way of a connector 28 directly to the output 22 of the modem whereby the control unit 27 of the printer 24 receives the same signals as the control unit 14 of the video display device 13.

Figure 2:
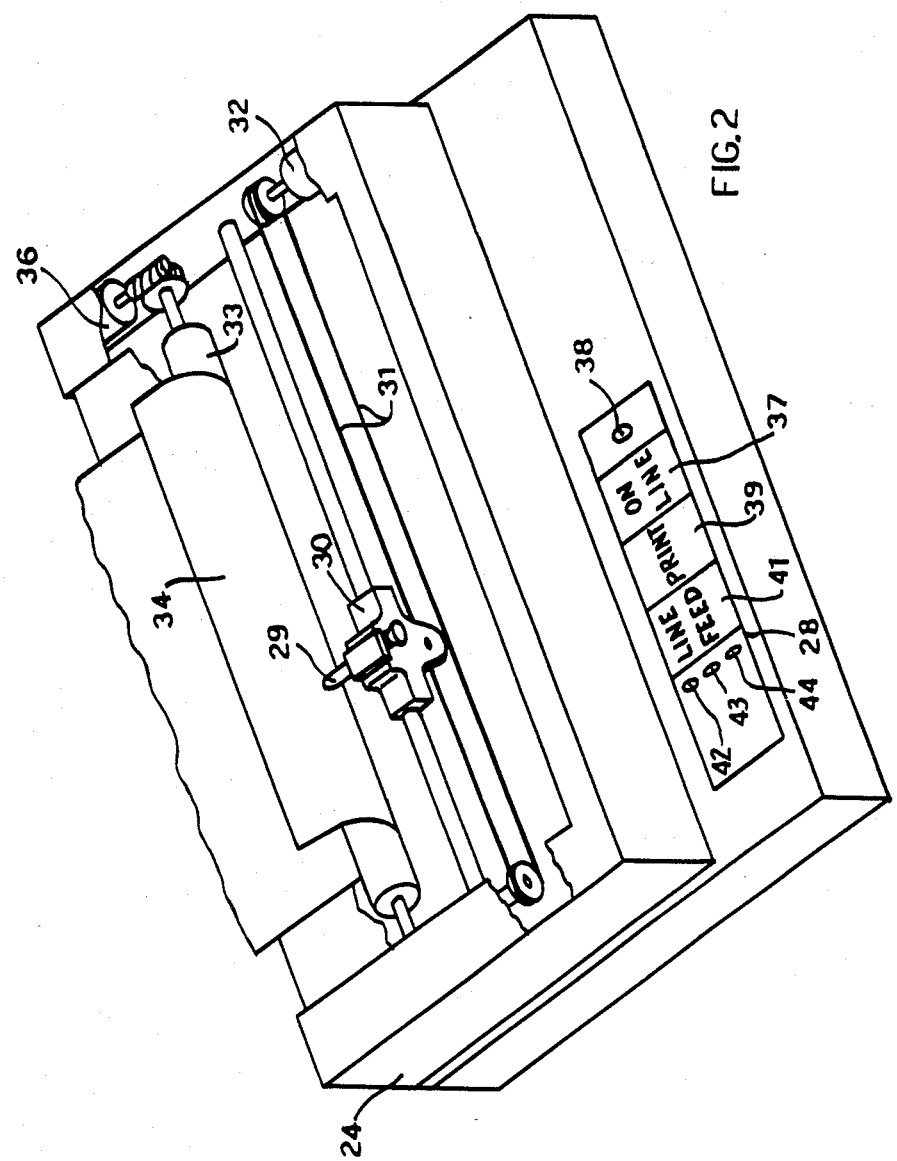
FIG. 2 is a diagrammatic perspective view of a dot printing device of the apparatus.

The printer 24 comprises a single printing element 29 (see FIG. 2) which is mounted on a carriage 30 which is connected by means of a cable 31 to a pulley mounted on a reversible electric motor 32 capable of moving the carriage 30 transversely with an alternating movement relative to the printer 24. By way of example, the printing element 29 may comprise a solid ink or lead which is capable of being energized by electrical pulses to emit a punctiform jet of ink by way of a nozzle, substantially as described in our U.S. Pat. No. 4,238,807. Alternatively, the printing element 29 may comprise a container of liquid ink which is provided with a nozzle for the selective ejection of droplets, for example of the type described in our published European patent application EP70110.

The printer 24 further comprises a platen roller 33 for carrying continuous roll paper 34, which is moved stepwise upwardly by means of a second small motor 36. Alternatively, the paper may be moved by means of pin wheels.

The keypad 26 comprises a two-position key 37 for defining, by means of the unit 27 (see FIG. 1), as will be seen in greater detail hereinafter, on-line and local connection of the printer 24. On-line connection causes a telltale lamp 38 to be illuminated (see FIG. 2). Another two-position key 39 normally serves to control printing of a page while a third key 41 normally serves to control the paper feed, for example to permit the page which has been printed to be detached from the continuous sheet. Also provided are two telltale lamps 42 and 43 for respectively indicating when the printer is in operation and when an error or a defect has occurred. A further telltale lamp 44 indicates when the ink of the printing element 29 is about to run out.

Figure 3:
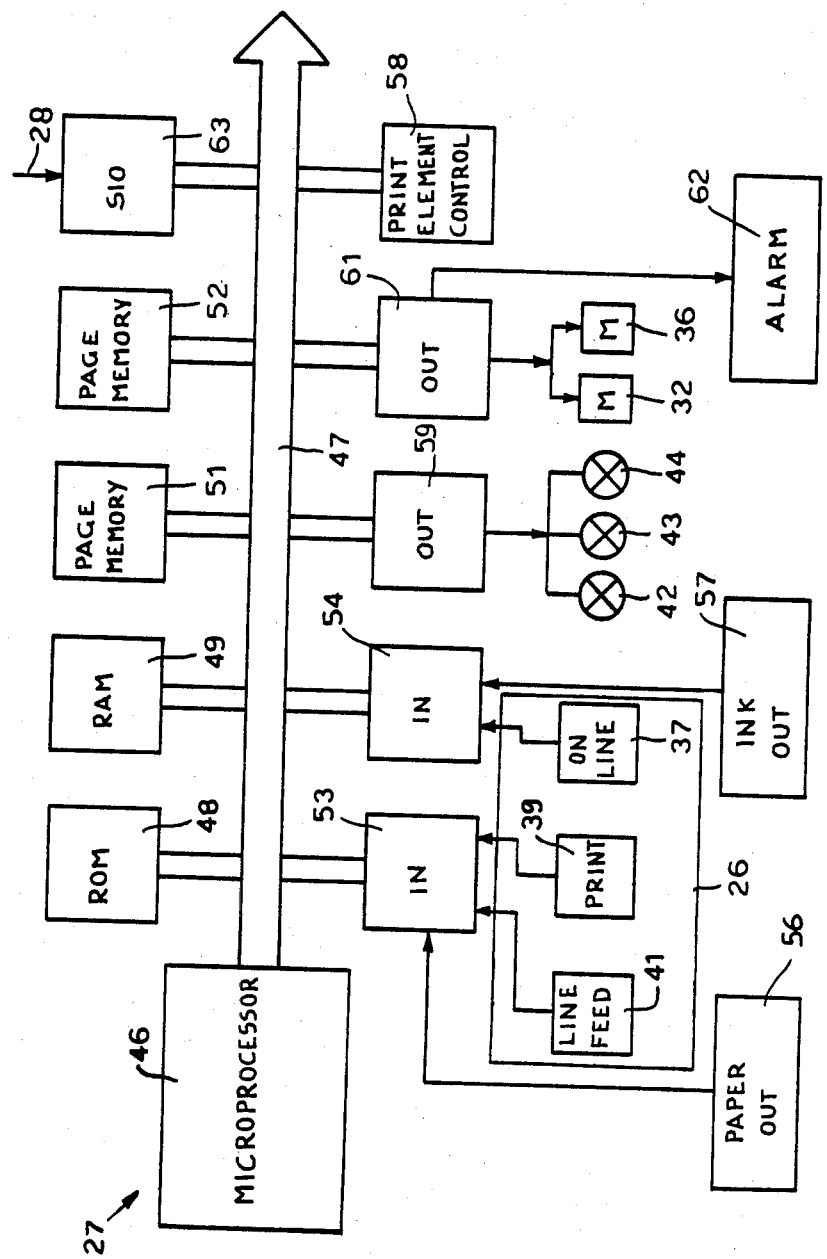
FIG. 3 is a block circuit diagram of the control unit of the apparatus.

The control unit 27 (see FIG. 1) of the printer 24 essentially comprises an 8-bit microprocessor 46 (see FIG. 3) which, by way of example, may comprise the Z80 microprocessor from the company Zilog. It comprises a series of internal operational registers and a bus 47 for data exchange with the exterior. Connected to the bus 47 is an 8K read only memory or ROM 48 containing the firmware of the printer, as will be described in greater detail hereinafter.

Connected to the bus 47 are three readwrite memories 49, 51 and 52, each with a capacity of 2K. The memory 49 constitutes the operational random access memory (RAM) of the apparatus while the two memories 51 and 52 which are the same as each other are capable of being alternately loaded with the data from the line for printing a page, whereby they will be referred to hereinafter as page memories.

Also connected to the bus 47 are two input units 53 and 54. Connected to the unit 53 are the keys 39 and 41 of the keypad 26 and a signalling means 56 for signalling some external conditions of the printer 24 such as paper out and opening of the cover of the printer. Connected to the unit 54 are the key 37 of the keypad 26 and a signalling means 57 for signalling that the ink in the printing element 29 is exhausted.

Finally, connected to the bus 47 are a control unit 58 for the element 29 for dot printing and two output units 59 and 61. Connected to the unit 59 are the three telltale lamps 42, 43 and 44 while connected to the unit 61 are the motors 32 and 36 of the printer 24 and an alarm signalling means 62 of the terminal.

The control unit 27 further comprises an interface unit 63 for connection to the line 22 by means of a connection 28. The unit 63 is an asynchronous serial interface (SIO) in ultrasimplified form for a structure of the 10 bit data, which comprises a start bit, seven data bits, one parity bit and one stop bit, whereby the control unit 27 of the printer 24 receives the same signals as the control unit 14 of the video display device 13.

The ROM 48 (see FIG. 4) comprises a first region 64 in which the usual program for initialization of the print apparatus is recorded, a second region 66 in which is recorded the firmware for recognition of the codes received from the line, the related transcoding and recording in the page memories 51 and 52 (see FIG. 3) and a third region 67 (see FIG. 4) which records the program required by the microprocessor 46 (see FIG. 3) for controlling the printing operation. The ROM 48 further comprises a foruth region 68 for recording the characters in decoded form in accordance with the print matrix, thereby forming the character generator.

The RAM 49 comprises a first region 70 (see FIG. 4) temporarily recording some signals and processing data, (workspace region). The RAM 49 further comprises an 880 byte region 71 which is used as a print buffer, in which are recorded the bytes supplied by the character generator of the region 68, being arranged in such a way as sequentially to control activation of the print element 29. The RAM 49 further comprises a region 72 which is used as a line buffer in which, as will be seen in greater detail hereinafter, each time that the CPU 46 (see FIG. 3) causes loading of the print buffer 71, the codes relating to the characters to be printed in the line are temporarily recorded. Finally, the RAM 49 comprises a region 73 (see FIG. 4) for recording the codes coming from the line, which are waiting to be processed and transcoded by the microprocessor 46 (see FIG. 3) to be stored in the page memories 51 and 52, whereby the region 73 (see FIG. 4) will be referred to hereinafter as FIFO (First in First out).

The two page memories 51 and 52 are the same as each other and are arranged each to contain the codes of 25 rows and 40 characters to be printed.

Transmission of the data from the data bank 10 to the terminal 12 is effected in coded form in accordance with the seven bit system set forth by Recommendation S.100 of the CCITT. That system provides a first type of characters, referred to as alphanumeric characters, which are each coded with a byte, in accordance with the table G0 of the standard ISO for the basic alphabet, Latin or Greek, and the table G2 of such standard for the additional signs, which can be accessed by means of a control code provided by table G0, referred to as Single Shift (SS2).

Each alphanumeric character may also be accompanied by other defining elements such as: a diacritic sign, underlining, masking, single or double width and height. All those elements are referred to as "attributes" of the alphanumeric characters and are transmitted on line by means of codes comprising two or more bytes.

In particular, a character with a diacritic sign is transmitted with a group of three bytes, comprising the control code SS2 followed by the code of the diacritic of table G2 and that of the character of table G0. Underlining is transmitted by another group of three bytes followed by the code comprising the code of the repeat control character (REP) followed by the code of the number of repeats required. The other attributes are transmitted with a group of two bytes comprising the output code of the table G0 ESC followed by a specific code of the attribute.

In addition, the system in accordance with Recommendation S.100 provides a second type of character, referred to as semigraphic characters, to represent non-alphanumeric figures.

Those characters are also coded with a byte in accordance with table G1 of the standard ISO incorporated in above-mentioned Recommendation S.100 and accessible from the table G0 with the byte of the command Shift-out (SO). Return from the table G1 to the table G0 is effected with the Shift-in byte (SI).

Figure 5A:
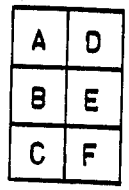

There are 64 semigraphic characters and, for a specific small area or elementary area, they represent a particular grey value (in the case of black and white display) or colour intensity (in the case of coloured display). The 64 semigraphic characters are produced by dividing the elementary area into a matrix comprising $2 \times 3$ squares indicated in FIG. 5a by the letters A:F. By selectively colouring a various combination of squares in black or in colour, various colour intensities are produced.

Figure 5B:
Figure 5C:
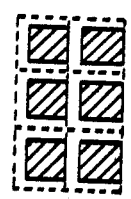

The semigraphic characters may be defined with a command as characters referred to as "contiguous" wherein the squares are completely coloured (see FIG. 5b) and as characters referred to as "separate" (5c) in which each square comprises an inner core portion which is possibly coloured and an outer edge portion which remains like the background.

Finally, for the transmission of colour data, there is defined a table of the standard ISO for coding the following colours: white, yellow, cyan, green, magenta, red, blue and black, both for the character and for the background. Those codes are coded by a group of two bytes comprising the output code ESC followed by the colour code byte. The code of the character and that of the background represent the attributes of semigraphic characters.

Finally, other commands are transmitted on line by means of single bytes or groups of bytes, which commands may concern either the arrangement or the movement of the image on the screen, and one or more alphanumeric and/or semigraphic characters. The command REP first referred to above may concern both types of characters and is particularly useful for representing blanks. A specific command in respect of the colours of the semigraphic characters is the reversal command represented by the code ESC followed by a specific byte. That serves for causing, for the line, reversal of the background colour with that of the character.

For the purpose of setting up the data received from the line for the printing operation, in accordance with the invention, the apparatus 27 (see FIG. 1) is arranged to process such data to transcode same and store the data temporarily in the page memories 51 and 52 in a compact and easily decodable manner. For that purpose, each character is represented in the transcoding operation by a two byte word in which the first byte corresponds to the ISO code of the character while the second byte represents the attributes relating thereto.

Figure 6:
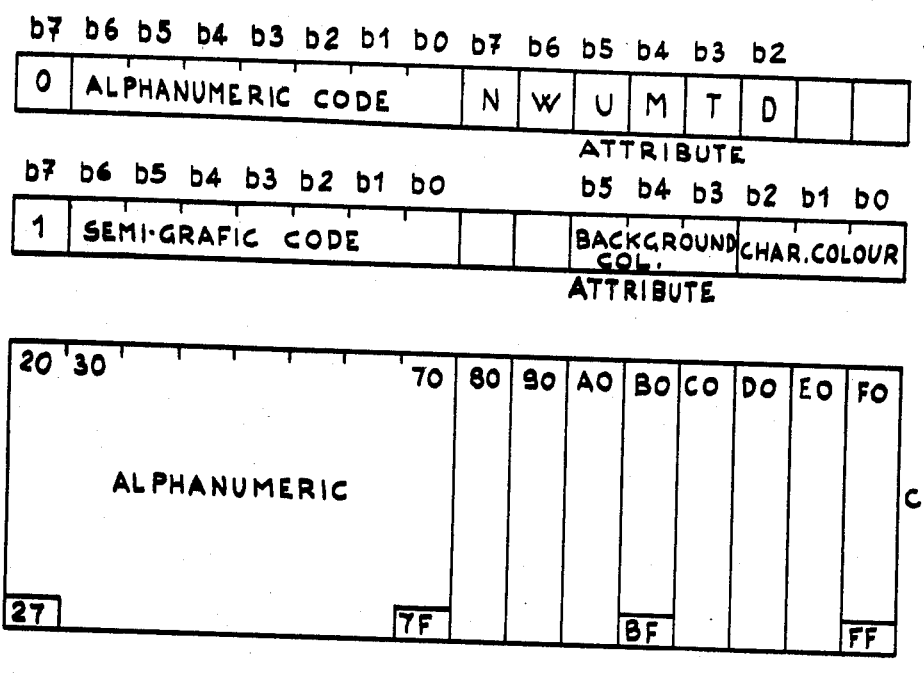
FIG. 6 is a chart showing intermediate coding in the apparatus, FIG. 7 (7a-7c) is a diagrammatic view of the alphanumeric and semigraphic decoding matrices for the printer.

A word indicating an alphanumeric character is represented in FIG. 6a and comprises, in the first bute, the bits b0-b6 of the ISO code of the table G0, the value of which in hexadecimal is between 20 and 7F while the bit b7=0 indicates that this is an alphanumeric character.

The attributes of each alphanumeric character are regrouped in the second byte, wherein each bit represents a corresponding attribute and the meaning of the individual bits is given in following Table 1.

TABLE 1

| bit | abbr. name | bit value | meaning |
|---|---|---|---|
| b2 | D | 0 | without diacritic |
|  |  | 1 | with diacritic |
| b3 | T | 0 | table G0 |
|  |  | 1 | table G2 |
| b4 | M | 0 | unmasked |
|  |  | 1 | masked |
| b5 | U | 0 | not underlined |
|  |  | 1 | underlined |
| b6 | W | 0 | single width |
|  |  | 1 | double width |
| b7 | H | 0 | single height |
|  |  | 1 | double height |

A word indicative of a semigraphic character, as shown in FIG. 6b, comprises in the first byte, the bits b0-b6 of a code corresponding to Table G1 of the ISO code, while the first byte always has the bit b7=1 (FIG. 6b) to indicate that this is a semigraphic character. In particular, for contiguous semigraphic characters, the bits b0-b6 of the ISO code are increased by 60, thus generating the bit b7=1, and assuming a hexadecimal value between 80 and BF. For the separate semigraphic characters, the bits b0-b6 of the ISO code are first increased by 60 and then subsequently by 40, also generating the bit b7=1 and assuming a hexadecimal value between C0 and FF. The value of the first byte in the three cases thus creates a single transcoding table which is diagrammatically illustrated in FIG. 6c.

The attributes of the semigraphic characters are combined in the second byte of the word and are coded with two groups of three bits: b0,b1,b2 for the colour of the character and b3,b4 and b5 for the colour of the background, as indicated in FIG. 6b.

The following Table 2 indicates coding of the various colours.

TABLE 2

| BIT | | | COLOUR | |
|---|---|---|---|---|
| b2, | b1, | b0 | CHARACTER | |
| b5, | b4, | b3 | BACKGROUND | |
| 0 | 0 | 0 | | BLACK |
| 0 | 0 | 1 | | RED |
| 0 | 1 | 0 | | GREEN |
| 0 | 1 | 1 | | YELLOW |
| 1 | 0 | 0 | | BLUE |
| 1 | 0 | 1 | | MAGENTA |
| 1 | 1 | 0 | | CYAN |
| 1 | 1 | 1 | | WHITE |

The region 68 of the ROM 48 (see FIG. 4) comprises a first portion 76 which, at the address supplied by a word of the transcoding operation, which is indicative of an alphanumeric character, is recorded with a series of signals representing the dots that the printer 24 (see FIG. 2) is to print to represent the corresponding character, whereby it constitutes the alphanumeric character generator. In particular, the portion 76 is arranged to decode, for the printing operation, the codes of the characters as the source of the dot characters in accordance with a 10×12 matrix wherein seven elementary rows and seven columns define the character. Two left-hand columns and three right-hand columns define the space between two adjacent characters.

Figure 7A:
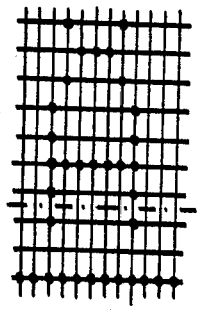

Between an alphanumeric row and the subsequent row there remain an elementary row at the top and two elementary rows at the bottom, which constitute the space between two alphanumeric rows. The last row at the bottom is used for writing the dots for underlining while the first row is used to write the diacritic signs. In the portion 76 of the region 68 of the ROM, the alphabetic characters with diacritics are given at the address of the code and the respective attribute, as if it were a separate ISO table similar to the tables G0, G1, G2, which will be referred to hereinafter as the auxiliary table GX. FIG. 7a shows the character Ä by way of example.

The printer 24 is of such dimensions that the distance between the dots of the row is 0.231 mm and the elementary line spacing is 0.353 mm. Therefore, the dimensions of the character are 2.11×1.38 mm, the spacing is 2.77 mm and the line spacing is 3.53 mm.

The region 68 of the ROM 48 (see FIG. 4) further comprises a second portion 74 which, at the address provided by the first byte of a word which is indicative of a semigraphic character is recorded with a series of signals representing the squares A–F that the printer is to print to represent the corresponding semigraphic characters whereby the portion 74 constitutes the semigraphic character generator. In particular, the semigraphic characters are decoded in accordance with a matrix comprising 10×12 dots (see FIG. 7b) wherein the dots are so distributed that each square comprises six columns and that the two pairs A,C and E,F of squares comprise three elementary rows while the pair B,D comprises four elementary rows. FIG. 7c shows the positions of the dots for the separate semigraphic characters. That arrangement is combined with the squared A–F provided by the code, in the manner which will be described hereinafter.

Figure 4:
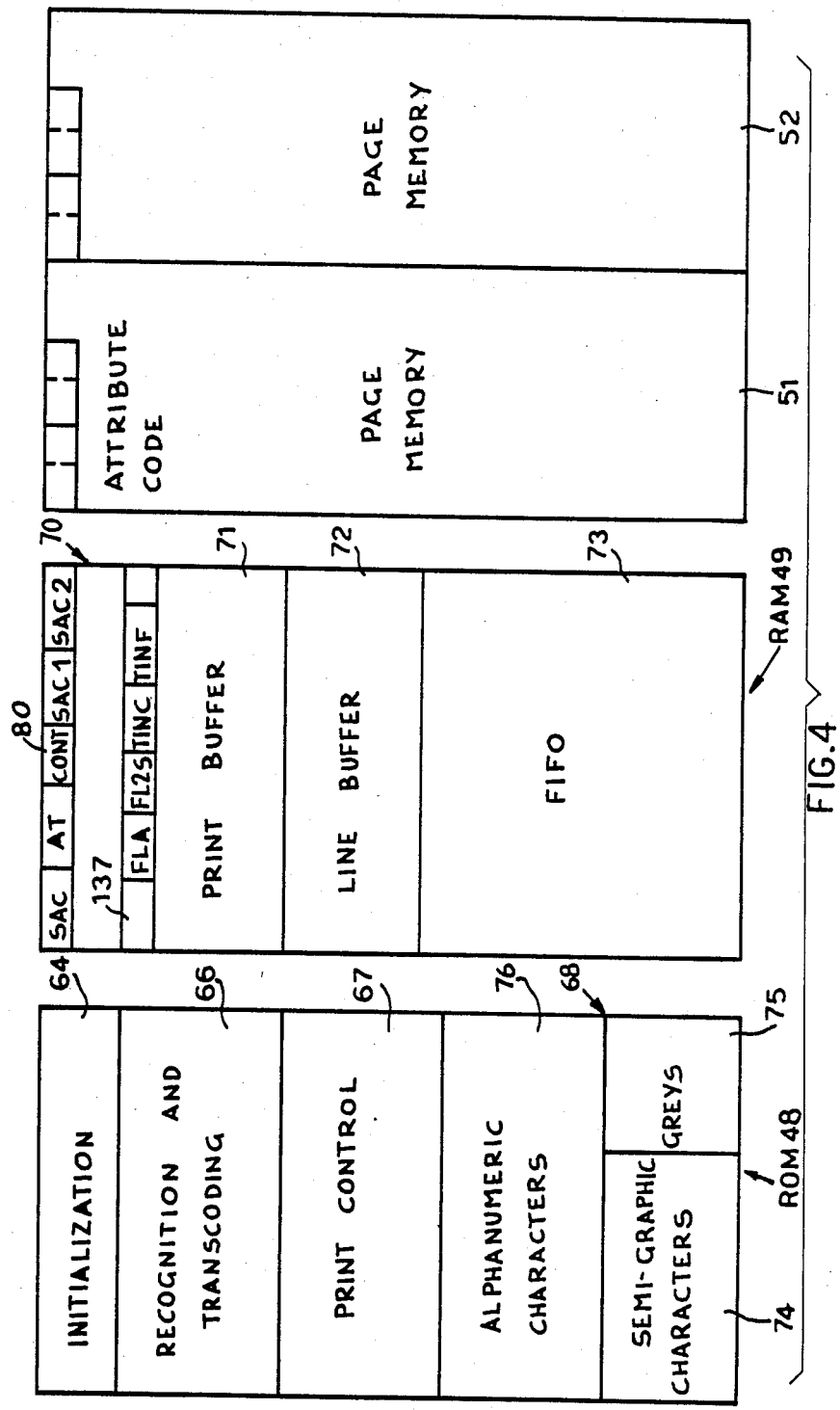
FIG. 4 is a diagram of the memories of the unit shown in FIG. 3, FIG. 5 (5a-5c) is a chart showing coding of semigraphic characters.
Figure 7B:
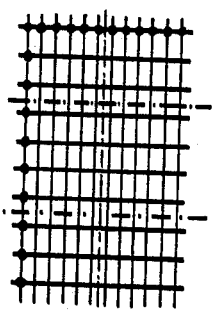
Figure 7C:
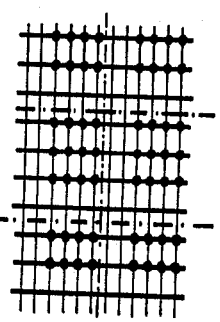

Since the columns of the matrix in FIGS. 7b and 7c have ten dot positions, two series of bytes correspond to each word inputted to the ROM 48 (see FIG. 4). A first series of bytes represents the arrangement of the dots on the columns which are limited to the first eight upper rows of the matrix, while a second series of bytes represents the arrangement of the dots in the columns of the last two rows of the matrix.

Figure 8:
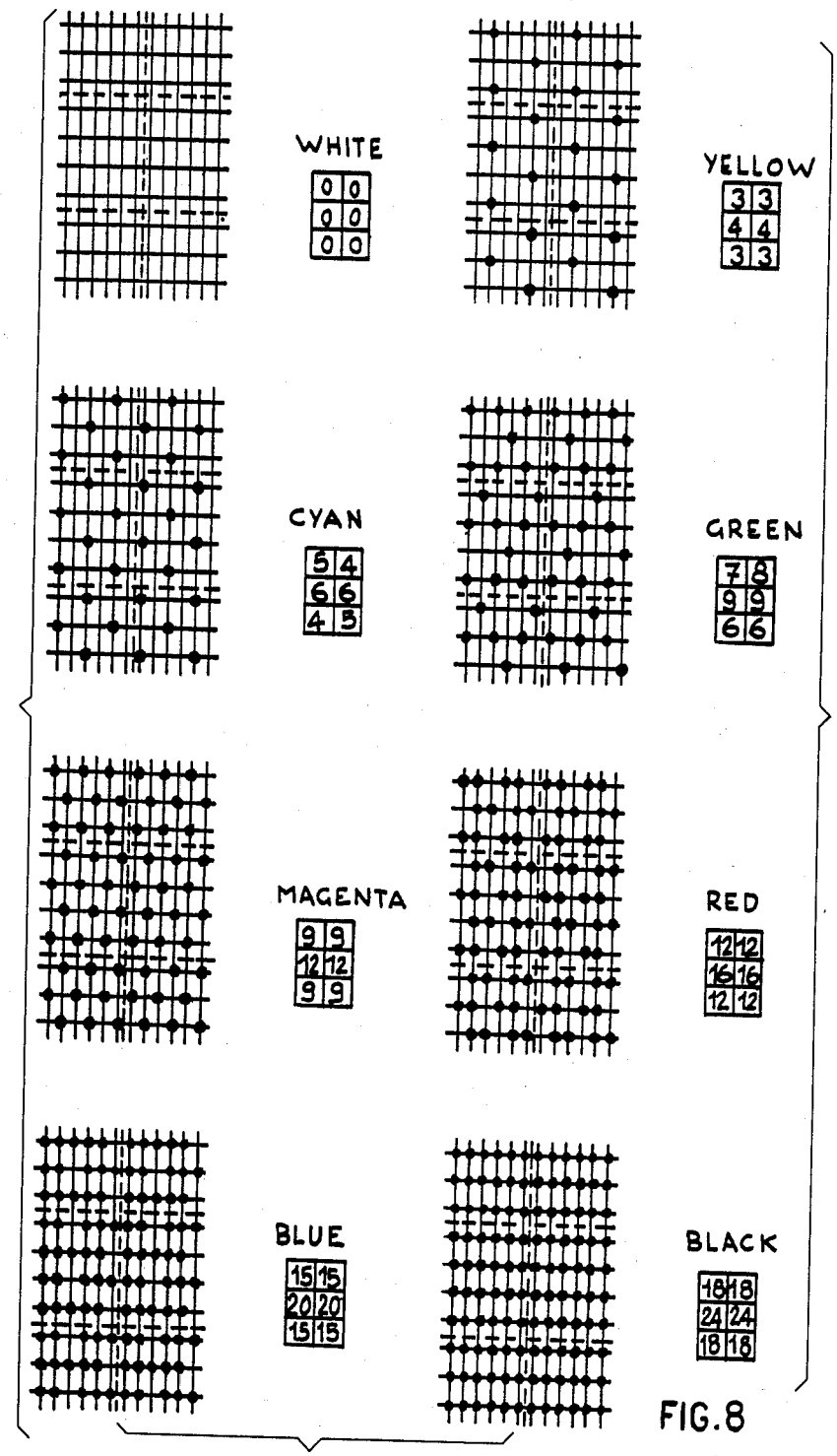
FIG. 8 is a chart showing decoding of the various grey values associated with the various colours.

The region 68 of the ROM 48 finally comprises a third portion 75 which, at the address provided by each of the two groups of bits of the second byte of the semigraphic character, is recorded with a series of signals corresponding to the dots to be printed to represent the colour, whereby decoding of the colours for the printer 24 (see FIG. 2) is defined for the semigraphic characters as grey values or levels. FIG. 8 shows the matrices of the semigraphic character with the dots printed in each of the six squares A:F for each of the eight colours referred to above. Indicated adjacent each matrix is the system with the number of dots printed in each square. Since the total of dots is 120, each colour is represented by a percentage of black dots, which is given by following Table 3:

TABLE 3

| Colour | No of black dots | % |
| --- | --- | --- |
| White | 0 | 0 |
| Yellow | 20 | 16.66 |
| Cyan | 30 | 25 |
| Green | 45 | 37.5 |
| Magenta | 60 | 50 |
| Red | 80 | 66.66 |
| Blue | 100 | 83.33 |
| Black | 120 | 100 |

FIG. 8 clearly shows that the arrangement of the dots is such that, repeating the same character a number of times horizontally and vertically, the distance of the dots in each line and in each column respectively remains constant. The microprocessor 46 (see FIG. 3) can be selectively conditioned in such a way as to control printing of a page which is recorded in the memory 51 or the memory 52 in three different modes which provide three different shades of grey without the information in the page memories 51 and 52 being altered or destroyed. A first mode which is referred to as the positive mode comprises causing the grey levels indicated in Table 3 to correspond to the codes of the various colours which are reproduced on the video display. The grey levels are also carried into the second column of the following Table 4, as an increasing intensity of grey, between white and black, giving a positive result in respect of printing on the paper. That printing mode affords the advantage of providing for faithful reproduction of the video image and is more agreeable if it is formed only by semigraphic characters, that is to say, it represents figures, views and the like.

A second printing mode, referred to as the negative mode, comprises reversing the correspondence in respect of the colours reproduced on the video display, with the grey levels of the second column. The negative correspondence is carried into the third column of Table 4 and indicates that for example a white character or a character of light colour of the video display is reproduced in black or in dark grey and a background which is black or of a dark colour on the video display is reproduced in white or in light grey. The result of printing on paper is thus a negative. A third printing mode, which is referred to as a partially positive mode, comprises reversing the black and white of the video display with the black and the white of the paper, leaving the correspondence in respect of the greys of the positive mode. That printing mode has the advantage in alphanumeric printing of leaving white the blanks or spaces between the characters, alleviating the printing work and making the image on the paper more pleasant.

TABLE 4

| Colour | Result on the paper | | |
| --- | --- | --- | --- |
| On the video display | Positive | Negative | Partially positive |
| White | White | Black | Black |
| Yellow | Very light grey | Very dark grey | Very light grey |
| Cyan | Light grey | Dark grey | Light grey |
| Green | Light-dark grey | Dark-light grey | Light-dark grey |
| Magenta | Dark-light grey | Light-dark grey | Dark-light grey |
| Red | Dark grey | Light grey | Dark grey |
| Blue | Very dark grey | Very light grey | Very dark grey |
| Black | Black | White | White |

Selection in respect of the print mode may be effected by means of the keys of the keypad 28.

As pointed out, when the key 37 is actuated, the central unit is enabled to receive the codes from the line. If, with the apparatus predisposed in that way, the key 37 is actuated again, followed by the print key 41, the microprocessor 46 is enabled to control printing of the last page which has been entirely stored in the memory, in accordance with the positive mode. If however, with the apparatus functioning on line, only the print key 41 is actuated, the central unit is enabled to cause printing of the last page which was memorized in accordance with the negative mode, which is the normal printing mode. If finally with the apparatus operating on line, the key 39 and the print key 41 are successively actuated, the microprocessor 46 is enabled to cause printing of the last page memorized in accordance with the partially positive mode. The commands required by the keypad 28 for the three printing modes are also set out in Table 5.

TABLE 5

| Printing mode | Positive | Negative | Partially positive |
| --- | --- | --- | --- |
| Sequence commands | ON LINE PRINT | PRINT | LINE FEED PRINT |

It will be clear from the preceding table therefore that printing is always controlled by the key 41 while the keys 37 and 39 serve for selecting the printing mode. The printing command may also come from the line 11, being sent directly by the data bank 10, intercalated with the data in respect of the characters, or transmitted by a remote operator.

The mode of operation of the printing apparatus will now be described with reference to the flow charts of FIGS. 9 to 12.

Figure 9:
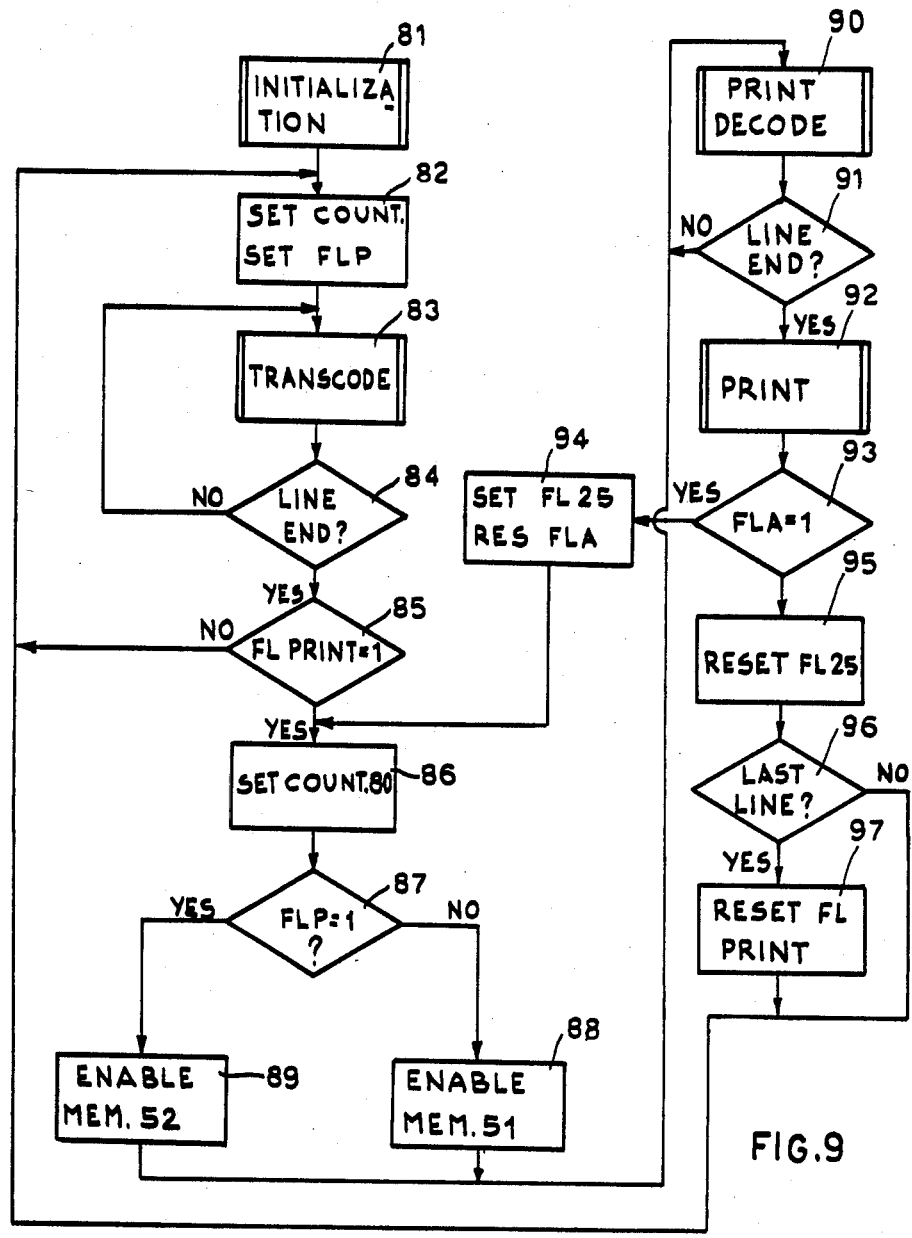
FIGS. 9, 10, 11 and 12 are flow charts of operation of the apparatus.

When the machine is switched on, the microprocessor 46 (see FIG. 3) automatically executes the initialization program recorded in the region 64 (see FIG. 4) of the ROM 48. That operation is indicated in FIG. 9 as a routine 81 and serves to set up the memories 49, 51 and 52 (see FIG. 4) to receive the codes and the printer 24 (see FIG. 1) for the possible printing operation.

After that initialization procedure, each code dispatched by the modem 19 by way of the line 22 and the control unit 21 to the control unit 14 of the video display 13, as already indicated, is also passed by way of the serial interface SIO 63 (see FIG. 3) to the control unit 27 of the printer. That code then causes an interruption in the program being carried out by the microprocessor 46, which now follows a routine for temporarily storing the code received from the line in the region FIFO 73 (see FIG. 4) of the RAM 49, in the same sequence in which it was received.

The microprocessor 46 however performs the program which is recorded in the region 66 and which consists of alternating a cycle of transcoding in respect of the codes received to memorize them in a line of one of the page memories 51 and 52, with an operation of printing a line of characters which are taken from the other page memory and the respective printing operation.

In particular, the microprocessor 46, when in an initialized condition, first executes an operation 82 for setting a page indicator FLP=0 to indicate that transcoding is taking place on page 51, or FLP=1 for page 52. A counter is also set with the number 40, that is to say, with the number of characters which can be contained in a line of the page memories 51, 52. There then follow a routine 83 (see FIG. 9) for taking a code from the FIFO 73 and the associated transcoding operation.

As will be seen more clearly hereinafter, that routine is terminated with an operation of counting down the counter which is set in the operation 82.

At the end of the routine 83, the microprocessor 46 performs a sampling operation 84 to establish if the transferred character was the last of the line. If not, the routine 33 is repeated while if the character transferred was in fact the last of the line, another sampling 85 is effected to establish if there is a print command. That may be set at any time locally by means of the key 41 (FIG. 3) and may be transmitted by the line. In both cases, the microprocessor 46 sets an indicator or flag FL PRINT in the region 70 (see FIG. 4) of the RAM 49, which is the subject of the sampling 85 (see FIG. 9).

Whenever the result of the sampling operation 85 is negative, the microprocessor 46 repeats the operation 82 and continues to repeat the transcoding routine 83. If however the result of the sampling operation 85 is positive, the microprocessor 46 effects setting of a counter 80 (see FIG. 4) of the region 70 of the RAM 49 with the number 40, that is to say, the number of characters to be extracted from a line of the page memory for the print operation (operation 86 in FIG. 9). It then executes a sampling operation 87 in respect of the page indicator or flag FLP and in dependence on the result of that sampling operation, enables the page memory 51, 52 which is not involved at the present time in the transcoding operation, for taking out the words (operations 88 and 89 respectively).

In any case, immediately afterwards, there are effected a routine 90 for decoding a word which has been taken from the page memory 51 or 52 and the associated operation of making up the dots to be printed in the line of characters which is stored in the print buffer 71 of the RAM 49 (see FIG. 4), in the manner which will be described hereinafter. The routine 90 is terminated with counting down the counter 80 which is set with the number of the words in the operation 86.

At the end of the routine 90 (see FIG. 9), a sampling operation 91 is carried out in respect of the counter 80 to establish if the operation of withdrawing the words of the line has been completed. As long as the result of the sampling operation 91 is negative, the routine 90 is repeated.

When however that result is positive, a routine 91 for printing the dots of a line is effected. Whenever a line of characters includes alphabetic characters of double height, those characters are printed by repeating substantially the routines 90 and 92 (see FIG. 9). For that purpose, as will be seen hereinafter, the double height command which is decoded in the routine 90 sets up a height indicator or flag FLA=1.

At the end of the routine 92, a sampling operation 93 is effected in respect of the indicator or flag FLA and, if that has been set, an operation 94 is performed for setting an indicator or flag FL2S which indicates that a second print cycle is required, while the flag FLA is reset. The operation 94 is followed by repetition of the operation 86 and thus the routine 90 for decoding the double height characters and the routine 92 for subsequently printing such characters.

If the sampling operation 93 gives a negative result and thus in each case after printing of the double height characters, an operation 95 is effected for resetting the flag FL2S. A sampling operation 96 is then effected to establish if the line printed is the last on the page. If not, the operation 82 is repeated while if so, an operation 97 is performed for resetting the print flag FL PRINT, before carrying out the operation 82.

The routine 83 for taking the character from the FIFO 73 and associated transcoding begins with a sampling operation 120 (see FIG. 10) for establishing if codes received on the line are present in a waiting condition in the FIFO 73 (see FIG. 4). If the result of that sampling operation 120 (see FIG. 10) is positive, the same sampling operation 120 is repeated. If however the sampling operation 120 gives a negative result, the first character is taken from the FIFO, which is temporarily transferred into a register SAC of the region 70 of the RAM 49 to be examined by the microprocessor 46 (operation 125 in FIG. 10). The microprocessor now carries out a first sampling operation 98 in respect of an indicator or flag in the region 70 of the RAM 49 which is set in consequence of recognition of a command ESC.

If the result of the sampling operation 98 is positive, a subroutine 99 is performed in which, in a series of operations, examination is made of one or two other characters which together with the code ESC define a command. As already indicated above, those commands comprise the attributes both of alphanumeric characters and of semigraphic characters, the command PRINT and the command REV for reversal in respect of background colours and character colours. The attributes which are recognized in that way are stored in the corresponding bits of a register AT of the region 70 as the second byte of the transcoding operation. The other commands are stored in suitable registers or indicator flags.

If however the result of the sampling operation 98 is negative, that means that the code taken out belongs to one of the tables G0, G1 and G2. In that case, a second sampling operation 100 is carried out to establish if the hexadecimal value of the code is <20.

If the result of the second sampling operation 100 is positive, that means that the code represents one of the commands set forth by table G0. There are now effected an operation 101 for recognition of the command and the associated recording operation in given registers of the region 70 of the RAM 49. In particular, the commands SO, SI, SS2 ESC and REP referred to above are stored by setting corresponding flags FL in the region 70 of the RAM 49. Since the command REP is followed by a code indicating the number of identical characters, that number is then stored in a counter which can be counted down and which, when it is zero, resets the flag FL of the command REP.

If the result of the sampling operation 100 is negative, a sampling operation 102 is now performed to establish if the hexadecimal value of the code is equal to 20 or is greater than 20. The first situation concerns a space while the second concerns a character which may be alphanumeric or semigraphic. In the case of a space, a sampling operation 103 is now effected in respect of the flag FL of the shift register SO to establish if it is an alphanumeric or a semigraphic space.

If the result of the sampling operation 103 is negative, that is to say, if it is an alphanumeric space, a sampling operation 104 is carried out to establish if by chance the space is not a space which is inserted between underlined words. Since the underlining attribute U (see FIG. 6a) is registered by setting the bit b5=1 in the second attribute byte, that bit is tested in the sampling operation 104 (see FIG. 10). If the result of the sampling operation 104 is positive, the transcoding operation does not vary the hexadecimal value whereby the alphanumeric space is recognised, and it will be treated as part of the character.

If however the result of the sampling operation 104 is negative (non-underlined alphanumeric space), just as in the case of the sampling operation 103 giving a positive result (semigraphic space), an operation 105 is executed in which the hexadecimal value 60 is added to the hexadecimal value 20 of the code, thereby transcoding all the spaces as semigraphic spaces, that is to say, with the six white squares A-F of a hexadecimal value 80.

Whenever the result of the sampling operation 102 is negative, a further sampling operation 106 is carried out to establish if what is involved is the cancellation character bearing a hexadecimal value 7F. In such a case, by means of an operation 107, the correction code is also replaced by the transcoding code of the semigraphic space character. If however the result of the sampling operation 106 is also negative, another sampling operation 108 is carried out, in respect of the flag of the shift SO and, in the event of a negative result, that is to say, alphanumeric characters, the hexadecimal value of the code remains unchanged in the register SAC.

If the result of the sampling operation 108 is positive, a sampling operation 109 is effected in respect of the flag of the repeat command REP. In fact, semigraphic characters are transmitted in compact form by using such a command after the semigraphic character followed by a code representing the number of identical characters.

If the result of the sampling operation 109 is negative, a first sampling operation 111 is performed to establish if what is involved is the code of the semigraphic character with the six black squares A-F, having the value 5F. If the result of the sampling operation 109 is positive, before the sampling operation 111 is carried out, an operation 110 is performed to count down the number of repetitions of the character. In any case, whenever the result of the sampling operation 111 is positive, the character is transcoded with the operation 105 into the code BF. If however the result of the sampling operation 111 is negative, a sampling operation 112 is carried out to establish whether the code is in columns 2 and 3 or in columns 6 and 7 of the table G1.

In the former case, the hexadecimal value 60 is added to the value of the code, in the operation 105. In the second case, an operation 113 (see FIG. 10) is carried out to add the hexadecimal value 40. It is now necessary to establish whether the character is a contiguous or separate semigraphic character. That is done by means of a sampling operation 163 to establish the existence of the appropriate command. If the result of the sampling operation 163 is negative, that is to say, if the character is a contiguous character, the code of the register SAC remains unaltered whereby transcoding of the contiguous semigraphic characters assumes a value between 80 and BF (see FIG. 6c). If however the result of the sampling operation 163 is positive, an operation 164 is performed in which 40 is added to the value of the register SAC which is produced by means of the operations 105 and 113, whereby transcoding of the separate characters assumes a value between CO and FF (see FIG. 6c). Transcoding of all the characters is therefore compacted like a hexagesimal table which comprises the values from 20 to FF.

The value produced in the register SAC by means of the operations 105, 107, 113 or 164 (see FIG. 10) represents transcoding of the first byte of the semigraphic character while that which exists in the event of the result of the sampling operation 104 being positive and the result of the sampling operation 108 being negative represents the first unchanged byte of the alphanumeric character.

The operation of transcoding the attributes is now initiated with an operation 115 in which, whenever the command REV has been stored in memory, the colour of the background is reversed, to that of the character. A sampling operation 116 is then effected to establish whether the hexadecimal value produced as the first byte is less than 80. If that is the case, that is to say, an alphanumeric character is involved, a sampling operation 117 is effected to establish if the colour provided for the background which, as will be seen hereinafter, is stored in a registered TINF of the RAM 49 (see FIG. 4) is identical to that of the character stored in a register TINC of the RAM 49. If the sampling operation 117 (see FIG. 10) gives a positive result, by means of an operation 118 the code of the character is replaced by the space code 80 since in any case the character would be illegible. An operation 119 is now effected, in which the attributes of the alphanumeric character, which were previously transcoded, are inserted into the register AT of the region 70 of the RAM 49 (see FIG. 4). If however the sampling operation 117 (see FIG. 10) gives a negative result, the operation 118 is jumped.

Figure 10:
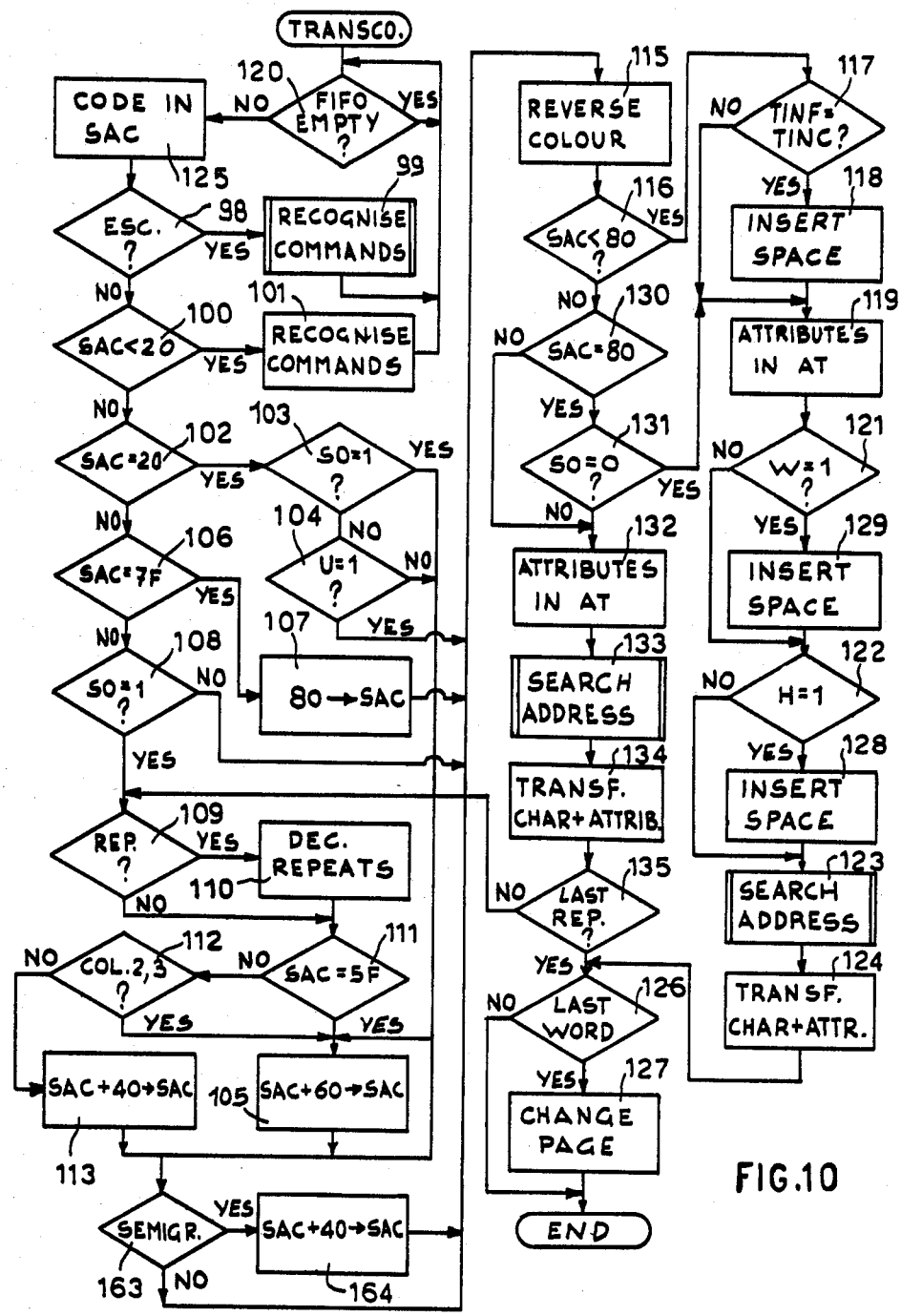
Figure 11:
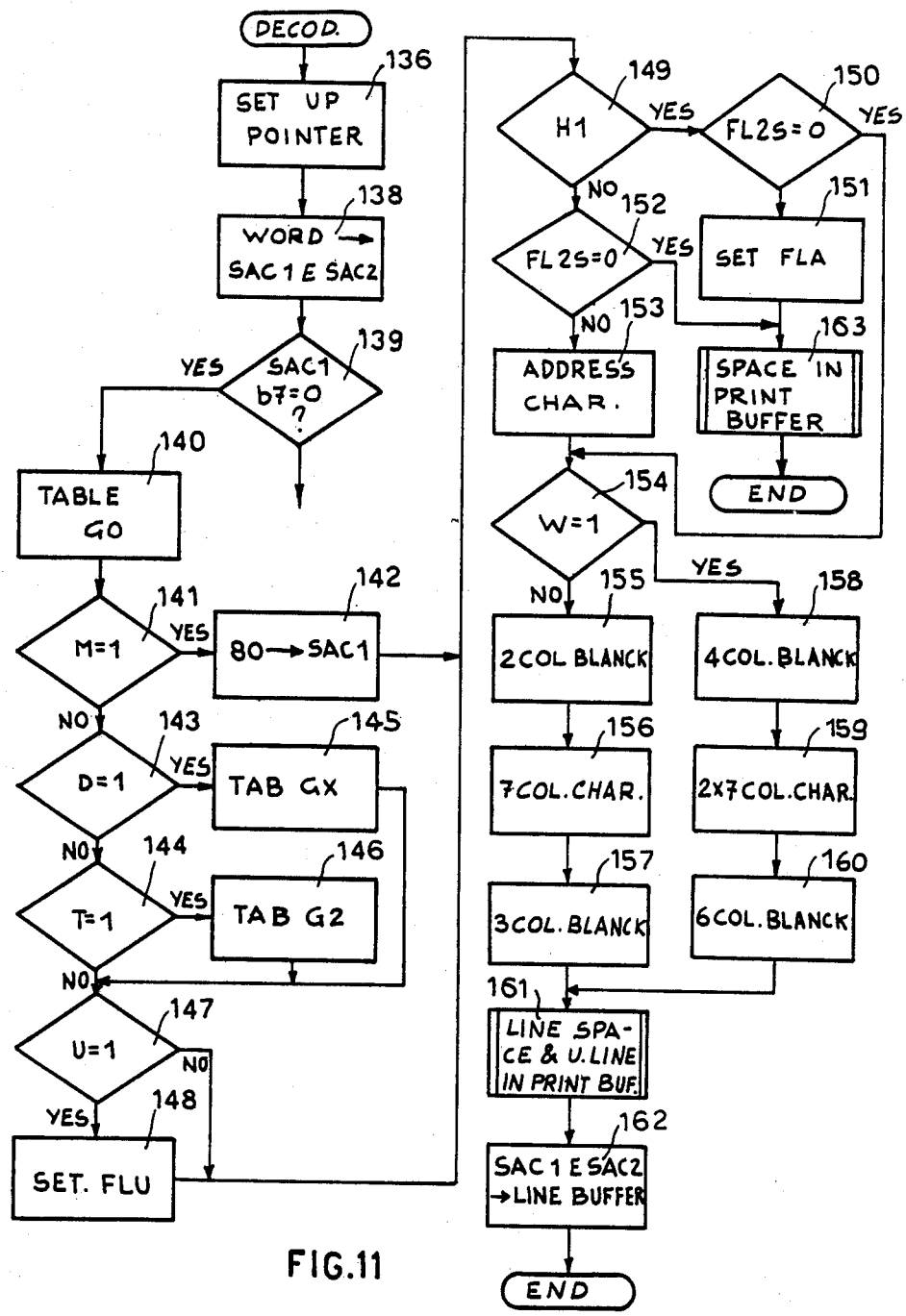
Figure 12:
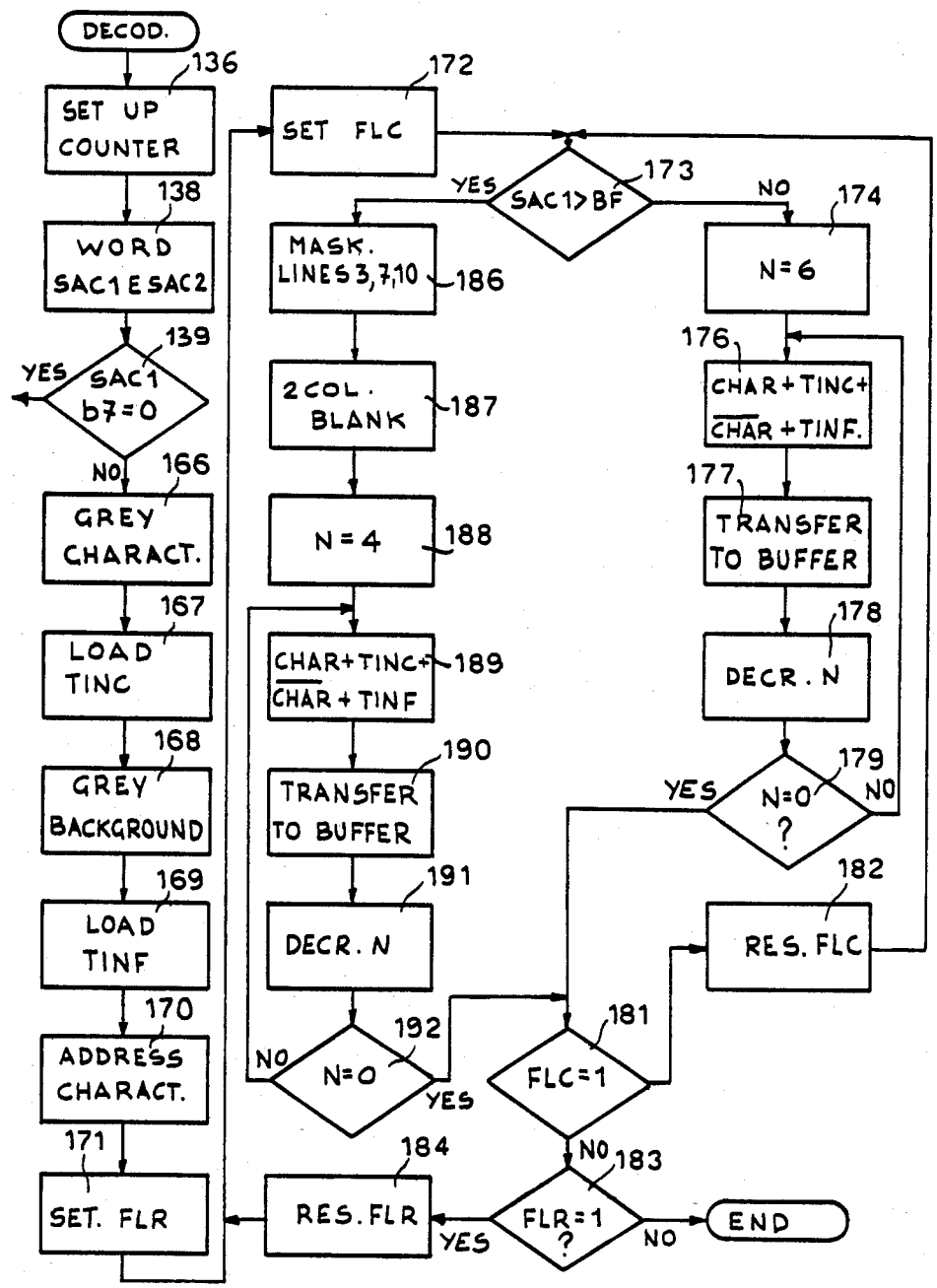

A sampling operation 121 is now effected in respect of the bit 6 of the register AT, that is to say, the width attribute W (see FIG. 6a) and, if the result is negative, a sampling operation 122 is carried out in respect of the bit 7 of the height attribute H (see FIG. 10). If the result of that sampling operation 122 is also negative, a subroutine 123 is now executed, for addressing the word of the page memory 51 or 52 concerned, excluding the first line which is always jumped in the normal print mode. Finally, an operation 124 is effected for transfer of the word which comprises the transcoding code of the character in the register SAC and the attributes in the register AT, into the page memory 51 or 52 (see FIG. 4). The operation 124 is followed by a test operation 126 to establish if what is involved is the last word of the page, in which case a page change operation 127 is effected, or not. In both cases, the routine for transferring the character into the page memory 51 or 52 is thus concluded.

In the situation where the result of the sampling operation 122 is positive, an operation 128 is carried out to insert a space into the corresponding word of the preceding line after the operation 123 has been effected. Whenever the preceding line was the first, since that does not accept characters to be printed, the double-height character is replaced by a character of normal height. When the result of the sampling operation 121 is positive, since the character to be printed will have to occupy a double space, an operation 129 is now effected for inserting a space with the same attributes, which comprises the operations from 123 to 126, after which the sampling operation 122 is repeated. Whenever the character to be transferred is in the column 40 of the page, the space character is suppressed whereby the double-width character is replaced by a character of normal width.

In the case where the result of the sampling operation 116 is negative, another sampling operation 130 is carried out to establish whether the value of the code of the character is equal to 80, that is to say, if the character is a space. Whenever that value is greater than 80, that is to say, a semigraphic character is involved, an operation 132 is carried out, for inserting into the register AT of the region 70 (see FIG. 4), the attributes of that character, that is to say, the code of the background and character colour as defined in the operation 115. There now follow a subroutine 133 and an operation 134 which are similar to the subroutine 123 and to the operation 124 for transferring the byte from the register SAC and the byte from the register AT into the page memory 51 or 52.

After the operation 134, a sampling operation 135 is executed to establish whether the repeat number counter is at zero. If so, the sampling operation 126 is effected, and the routine is completed. If the counter is not at zero, the sampling operation 109 is repeated whereby it is clear that a repeated character is recorded in the page memory with a number of words equal to the repeat number.

Finally, whenever the sampling operation 130 gives a positive result, a further sampling operation 131 is carried out to establish whether a semigraphic space is involved, in which case the operation 132 is effected, or whether an alphanumeric space is involved, in which case the operation 119 is effected.

The routine 90 (see FIG. 9) for decoding the words for the print operation begins with an operation 136 (see FIG. 11) for predisposition of a pointer for line and column of the memory 51 or 52 to be printed, in a register 137 (see FIG. 4) of the region 70 of the RAM 49. An operation 138 (see FIG. 11) then follows, for taking the word which is pointed in two registers SAC1 and SAC2 in the region 70 (see FIG. 4). The register SAC1 now stores the first byte of the word while the register SAC2 stores the attributes.

A sampling operation 139 is now effected in respect of the bit b7 of the register SAC1 to establish whether an alphanumeric or a semigraphic character is involved. In the former case, an operation 140 is effected by means of which a portion corresponding to the table ISO G0 is pointed in the region 76 of the ROM 48 (see FIG. 4). A sampling operation 141 (see FIG. 11) is then effected in respect of the bit b4 of the register SAC2, to establish whether a masked character is involved. If the result is positive, an operation 142 is performed whereby a space code is forced into the register SAC1, thus making the character. If the result is negative, a sampling operation 143 is effected in respect of the bit b2 of the register SAC2 in order to establish whether a diacritic character is involved and if also the result of that sampling operation is negative, another sampling operation 144 in respect of the bit b3 of the register SAC2 establishes whether a supplementary character, that is to say, of the table G2, is involved.

However, if the result of the sampling operation 143 is positive (character with diacritic), an operation 145 is effected to replace the pointing of the portion 76 of the region 68 corresponding to the table G0 by the portion corresponding to the auxiliary table GX of the characters with diacritics. Similarly, if the result of the sampling operation 144 is positive (supplementary character), an operation 146 is effected whereby the pointing of the portion of the table G0 is replaced by pointing of the portion corresponding to the table G2. In the operation 145 or 146 or, in the event of the result of the sampling operation 144 being negative, a further sampling operation 147 is effected in respect of the bit b5 of the register SAC2 in order to establish whether an underlined character is involved and, if the result is positive, an operation 148 is effected to set a flag FLU.

After that operation 148, just as after the operation 142 or, in the event of the result of the sampling operation 147 being negative, a sampling operation 149 is effected in respect of the bit b7 of the register SAC2 (see FIG. 4) to establish if a double-height character is involved.

If the result is positive, a sampling operation 150 (see FIG. 11) is effected in respect of the flag FL2S to establish whether the first decoding (negative result) or the second decoding of the line is involved. In the former case, an operation 151 provides for setting the flag FLA which predisposes setting the flag FL2S in the operation 94 (see FIG. 9) after the routine 92 of the first print.

If the result of the sampling operation 149 (see FIG. 11) is negative, another sampling operation 152 is effected in respect of the same flag FL2S and, if that has a negative result, an operation 153 is carried out in which the character indicated by the register SAC1 is addressed, in the part 76 of the portion 68 corresponding to the preselected table. Finally, a test operation 154 is effected in respect of the bit 6 of the register SAC2 in order to establish whether the character is of double width.

If the character is a character of normal width (negative result from the sampling operation 154), an operation 155 is effected first to deposit, in the position pointed in the print buffer 71 (see FIG. 4) of the RAM 49, two bytes of bits =0, that is to say, blanks, representing the two columns of dots to the left of the dots of the character in the true sense (see FIG. 7a). There then follows an operation 156 for depositing in the print buffer 71 the seven bytes of the portion 76 of the region 68 (see FIG. 4) which is pointed by the operations 140, 142, 145 or 146 (see FIG. 11) at the address of the code of the character. The bits = 1 of each of the seven bytes represent the dots to be printed in the corresponding column of the character (see FIG. 7a). An operation 157 (see FIG. 11) is finally effected to deposit three blank bytes representing the three columns of dots to the left of the character (see FIG. 7a).

When the sampling operation 154 (see FIG. 11) gives a positive result, three operations 158, 159 and 160 are carried out in succession, being similar to the operations 155, 156 and 157, in each of which however double the number of bytes are deposited. In particular, in the operation 159, each column of dots, which is taken from the portion 76 of the region 68, is deposited twice, whereby the width of the character in the printing operation is doubled.

After the operation 157 or after the operation 160, a subroutine 161 is carried out to deposit in the print buffer 71 the bits corresponding to the elementary lines of the line spacing (see FIG. 5a), taking account of the flag FLU which is possibly set by the operation 148. That flag causes the bits corresponding to the line 10 of the character to be set to 1. At the end of the subroutine 161, the flag FLU is reset and an operation 162 is effected for registration of the character contained in the registers SAC1 and SAC2 (see FIG. 4) in the line buffer 72, whereby the line to be printed is also gradually copied from the page memory into the line buffer 72. The decoding routine is now repeated for the subsequent character.

As seen hereinbefore, at the end of the print routine 92 (see FIG. 9), sampling 93 of the flag FLA is effected. If the flag FLA was set in the operation 151 (see FIG. 11), the line decoding routine 90 (see FIG. 9) is repeated, the codes of the characters now being taken from the line buffer 72 (see FIG. 4). Now, in that routine, both the sampling operation 150 (see FIG. 11) and the sampling operation 152 give a positive result. The positive result of the sampling operation 150 is followed by the operations 154 to 161 for the double-height characters whereby the dots to be printed as provided by the selected table are set in the print buffer 71 (see FIG. 4). The positive result from the sampling operation 152 is however followed by a subroutine 163 which decodes for the print operation and transfers into the buffer 71 a space character whereby the normal-height characters are no longer transferred into the buffer 71.

In the event that the result of the sampling operation 139 is negative, whereby the character to be decoded is semigraphic, an operation 166 (see FIG. 12) is first effected, for modifying the attribute of the colour of the character recorded in the register SAC2 (see FIG. 4) in accordance with the predisposition of the keys of the keypad 26 (see FIG. 3) whereby the result represents the address of the grey which is assumed as the colour of the character. There now follows an operation 167 (see FIG. 11) which permits addressing in the portion 75 of the region 69 of the ROM 48, of the pattern of the corrresponding grey (see FIG. 8) which is stored in a group of registers TINC of the portion 70 (see FIG. 4) of the RAM 49. There now follow two operations 168 and 169 (see FIG. 11) which are similar to the operations 166 and 167 whereby the pattern of the grey corresponding to the colour of the background resulting from the commands from the keypad 26 is stored in a second group of registers TINF of the portion 70 of the RAM 49.

An operation 170 (see FIG. 12) is now effected for addressing in the portion 74 of the region 68 of the ROM 48, in accordance with the address given by the register SAC1, thus storing the pattern of squares A–F (see FIG. 5a) for the character. An operation 171 (see FIG. 12) is now effected for setting a flag FLR=1 to indicate that a first decoding cycle is begun, being limited to the first eight elementary lines of the semigraphic character (see FIGS. 7b and 7c) whereby each column can be represented by a byte. An operation 172 (see FIG. 12) is now performed, in which another flag FLC=1 is set to indicate the commencement of decoding of the three squares A, B, C (see FIG. 5a) of the character.

A sampling operation 173 (see FIG. 12) is now effected in respect of the register SAC1 to establish whether the character is a separate semigraphic character (SAC1 BF) or a contiguous semigraphic character. If the result of the sampling operation 173 is negative (contiguous character), a counter N=6 is set to represent the six columns of the squares (operation 174) and an operation 176 is performed which in succession comprises AND of decoding of the character (squares A, B and C full) with decoding of the column of dots, represented by the register N, the colour of the character stored in the register TINC, AND of decoding of the negative character with decoding of the column of dots, represented by the register N, the colour of the background as stored in the register TINF and AND in respect of results of the first two AND.

An operation 177 is now effected for transferring the final result into the byte of the print buffer 71 (see FIG. 4) of the RAM 49 indicated. There now follows an operation 178 (see FIG. 12) for counting down the register N, followed by a sampling operation 179 in respect of that register. As long as that register is not at zero, the operations 176–178 are repeated; when however it is at zero, a sampling operation 181 is effected in respect of the flag FLC and if the latter is at 1, it is reset (operation 182). The subroutine then repeats the sampling operation 173, the AND of the operation 176 are effected with decoding of the three squares D, E and F of the second column.

If however the result of the sampling operation 181 is negative, a sampling operation 183 is carried out in respect of the flag FLR and, if the latter is at 1, it is reset (operation 184). The subroutine then repeats the operation 172 for effecting a second decoding cycle for the last two elementary lines 9 and 10 of the semigraphic character (see FIGS. 7b and 7c). Finally, if the result of the sampling operation 183 is also negative, the semigraphic character decoding routine is terminated.

If the result of the sampling operation 173 is positive, that is to say, if the character is a separate semigraphic character, an operation 186 is first carried out, by means of which the elementary lines 3 and 7 of dots are masked in the first decoding cycle, as set forth in FIG. 7c. In the second cycle however, only the line 10 is masked. There then follows an operation 187 by means of which two columns of blanks are generated for the print buffer 71. The register N is then set to 4 (operation 188) to represent the four columns of dots to be registered in each square AF of the character. That is followed by an operation 189 which comprises, for each column, AND in respect of the decodings of the character masked, as referred to above, and the colour relating thereto, AND of the negative of the character and the colour of the background, and the resulting AND. There then follows an operation 190 for transferring the result followed by a counting-down operation 191 in respect of the register N, and a sampling operation 192 in respect of the register N, similarly as set out above in respect of the operations 177 and 178 and the test operation 179, and the subroutine continues with the test 181.

To execute the print routine 92 (see FIG. 9), the microprocessor 46 (see FIG. 3) executes the program stored in the region 67 of the ROM 48 (see FIG. 4). That now controls the pilot control circuit 58 (see FIG. 3) in accordance with the dots stored in the buffer 71 (see FIG. 4) and, by means of the unit 61 (see FIG. 3), controls the motor 32 (see FIG. 2) so as to cause the carriage 30 of the printing element 29 to be moved transversely by a number of distances equal to the number of elementary lines of print, while by means of the motor 36, it advances the paper 34.

At the end of the line print routine 92 (see FIG. 9), whenever the operation 94 is effected, the program of the portion 67 causes the microprocessor 46 (see FIG. 3) to effect by means of the unit 36 a rotary movement in the reverse direction of the motor 36 so as to return to the point of printing the first elementary line of the line of characters which was last printed. As already described hereinbefore, in that line the transcoding code of the page memory 51 and 52 will be a space code whereby disposed in the position of the characters of double height on the paper are two spaces in the last two lines of characters. The print program now actuates the unit 58 for two travel movements of the carriage 30 (see FIG. 2) in accordance with the dots recorded for each elementary line in the print buffer 71, whereby the alphanumeric characters are printed at double height.

It will be apparent that the print apparatus and the associated sequences of operations as described hereinbefore may be the subject of various modifications, additions, substitutions and improvements without thereby departing from the scope of the invention. For example, the print head may be provided with a plurality of print elements for printing the dots of a character column in parallel or for printing each one in a vertical portion of the paper. In addition, the groups of registers TINC and TINF (see FIG. 4) may be replaced by simple flags capable of addressing the corresponding colours in the portion 75 of the ROM 48.

We claim:

1. An apparatus for a videotex communicating terminal comprising a modem for demodulating signals received from a line and representing coded data, a video display for displaying alphanumeric and semigraphic characters corresponding to said coded data, a dot printer for printing alphanumeric and semigraphic characters corresponding to said coded data on a print carrier, video control means connected between said modem and said video display for decoding the coded data received by said modem and controlling said video display to display the decoded characters, and a printer control unit connected between said modem and said printer for decoding the coded data received by said modem independently of said video control means and for controlling said printer to print the characters decoded by said printer control unit, said printer control unit including transcoding means for transcoding the coded data received by said modem and supplying the transcoded data to said printer, memory means for temporarily storing the data so transcoded, means for providing a selectively operable print command, and a character generator operable in response to said print command to decode the data stored in said memory means to control said printer.

2. Apparatus according to claim 1, characterised in that said memory means include two page memories (51, 52) controlled by the transcoding means in such a way as to alternate loading of the data into the two page memories, whereby while one page is being loaded the other page can be controlled by the print command and accumulating means for accumulating the data so decoded in a print buffer (71) for controlling a printer actuating unit (58).

3. Apparatus according to claim 2, characterised in that said printer control unit comprises a microprocessor (46) incorporating the transcoding means and said accumulating means, said microprocessor being capable of transcoding print attributes of a character into a single attribute code, whereby each character is stored in the page memories with a byte indicating the character and a byte indicating the relevant attribute code, the microprocessor being so programmed as to alternate the loading of a line of characters in one of said page memories (51, 52) with decoding of a line taken from the other page memory, said actuating unit being controlled in a time sharing mode with the loading and decoding operations.

4. Apparatus according to claim 3, characterised in that the attributes of each alphanumeric character comprise indications on at least one of the two dimensions of the alphanumeric character.

5. Apparatus according to claim 3, characterised in that the attributes of each semigraphic character comprise indications in respect of the colour of the background and the colour of the semigraphic character.

6. Apparatus according to claim 5, wherein the character generator comprises a read only memory (48) wherein the dots to be printed for each character are recorded, characterised in that said read only memory (48) comprises a first portion (76) for generating said alphanumeric characters and a second portion (74) for generating said semigraphic characters.

7. Apparatus according to claim 6, characterised in that said read only memory (48) further comprises a third portion (75) for generating for each colour code a corresponding grey value whereby a coloured image received by the video display is printed as a monochrome image with half tones.

8. Apparatus according to claim 7, wherein said semigraphic data are decoded by the second memory portion (74) as colour pixels, characterised in that the third memory portion (75) is capable of decoding each pixel in accordance with a dot matrix wherein the number of black dots in the matrix represents the value of the grey, the horizontal and vertical distances of the dots for adjacent pixels of the same colour being constant.

9. Apparatus according to claim 7, characterised by control means (39) for conditioning said microprocessor (46) to reverse the colour of the semigraphic character with that of the background to produce a negative print, and other control means (41, 37) for conditioning said microprocessor to perform the reversal only in black and white.

10. Apparatus according to claim 9, characterised in that said microprocessor (46) is adapted to control the decoding by the read only memory (48) for selectively obtaining pixels either as contiguous semigraphic characters formed by a matrix of 2×3 cells wherein each cell may assume various grey values or as negative semigraphic characters formed by a matrix of 2×3 cells wherein each cell has a central portion with the grey value and a contour portion with the background colour.

11. Apparatus according to claim 3, characterised in that the printer operates serially on a line of print, the microprocessor (46) being capable of loading said alphanumeric characters and said semigraphic characters into the print buffer (71) as a column of dots to be printed, each represented by two bytes.

12. Apparatus according to claim 4, characterised in that in response to a double-height attribute of an alphanumeric character, the printer is conditioned to print each elementary line of the character twice.

13. Apparatus according to claim 1, characterised in that the printer comprises a single ink jet print element for printing one dot at a time, said print element being movable with an alternating motion along a line, means (33, 36) being provided to advance the print carrier by an elementary line spacing during one of the alternating movements of the print element, said printing actuating unit being conditioned by said memory means for supplying said print element with control signals arranged according to said alternating motion.

* * * * *